United States Patent
Lerg et al.

(12)
(10) Patent No.: US 6,288,643 B1
(45) Date of Patent: *Sep. 11, 2001

(54) GRAFFITI DETECTION SYSTEM AND METHOD OF USING THE SAME

(75) Inventors: George H. Lerg, Carlsbad; Arthur J. Devine, Escondido; Donald L. Roberts, Escondido; Randy E. Johnson, Escondido, all of CA (US)

(73) Assignee: Traptec Corporation, Rancho Santa Fe, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/588,863

(22) Filed: Jun. 6, 2000

Related U.S. Application Data

(60) Provisional application No. 60/194,082, filed on Mar. 27, 2000, provisional application No. 60/137,962, filed on Jun. 7, 1999, and provisional application No. 60/180,771, filed on Feb. 7, 2000.

(51) Int. Cl.[7] .................................................. G08B 21/00
(52) U.S. Cl. .................. 340/540; 340/573.1; 340/539; 340/541; 340/565; 340/566; 340/621; 340/683; 340/691.1
(58) Field of Search .............................. 340/540, 573.1, 340/902, 904, 943, 546, 442, 446, 539, 541, 545.2, 545.4, 566, 565, 571, 621, 683, 691.1, 692, 691.2

(56) References Cited

U.S. PATENT DOCUMENTS

| | | | |
|---|---|---|---|
| 4,031,502 | * 6/1977 | Lefaudeux et al. | 340/10 |
| 4,097,835 | * 6/1978 | Green | 340/1 R |
| 4,399,687 | * 8/1983 | Collins | 73/23 |
| 4,931,949 | * 6/1990 | Hernandez et al. | 364/497 |
| 4,996,521 | * 2/1991 | Hollow | 222/61 |
| 5,417,219 | * 5/1995 | Takamizawa et al. | 128/663.01 |
| 5,528,220 | * 6/1996 | Woods | 340/541 |
| 5,587,533 | * 12/1996 | Schneider et al. | 73/614 |
| 5,675,318 | * 10/1997 | Hunt, Jr. | 340/540 |
| 5,798,457 | * 8/1998 | Paulson | 73/587 |
| 5,839,109 | * 11/1998 | Iwamida | 704/271 |
| 5,855,297 | * 1/1999 | Tichenor et al. | 222/61 |
| 5,866,321 | * 2/1999 | Matsue et al. | 435/5 |
| 6,024,703 | * 2/2000 | Zanelli et al. | 600/437 |
| 6,055,930 | * 5/2000 | Stein et al. | 119/14.08 |
| 6,129,680 | * 10/2000 | Motram | 600/532 |

* cited by examiner

*Primary Examiner*—Nina Tong
(74) *Attorney, Agent, or Firm*—Lyon & Lyon LLP

(57) ABSTRACT

The present invention involves a system and method for detecting a graffiti-making act such as the spray of a spray paint can, the writing with a felt-marker pen on a surface, and the scratching with an abrasive instrument on a surface. The system includes one or more sensors adapted to sense the graffiti-making act and transmit a signal representative of the graffiti-making act, and a base unit including electronics adapted to process the signal and determined whether the signal represents a graffiti-making act, and a communication device coupled to the electronics and adapted to communicate to one or more entities that a graffiti-making act has been detected. The method includes sonically detecting the graffiti-making act, and initiating an alarm indicating that the graffiti-making act took place.

81 Claims, 4 Drawing Sheets

GRAFFITI DETECTION SYSTEM AND METHOD OF USING THE SAME

RELATED APPLICATIONS

This application claims priority to the following U.S. Provisional Applications: U.S. application Ser. No. 60/137,962 entitled "Graffiti Detection System," filed Jun. 7, 1999; U.S. application Ser. No. 60/180,771 entitled "Olfactory Detection of Graffiti," filed Feb. 7, 2000; and U.S. application Ser. No. 60,194,082 entitled "Acoustical Detection of Firearm," filed Mar. 27, 2000.

BACKGROUND OF THE INVENTION

1. Field of the Invention

The present invention relates, in general, to sonic detection systems and methods, and, in particular, to graffiti detection systems and methods.

2. Related Art

The following description of the background of the invention is intended to aid in the understanding of the invention, but is not admitted to describe or constitute prior art to the invention.

Every day, countless acts of graffiti are being committed to public and private property throughout the world. The property damage resulting from graffiti is estimated to be in the billions of dollars annually. Further, graffiti tends to be a recurring problem. For example, if a structure surface such as a wall is tagged with graffiti, to eliminate the graffiti, the property owner may have the graffiti removed by, for example, power washing the surface, or, more likely, will paint over the graffiti with a paint that is the same or similar to that on the rest of the surface. However, removing graffiti is frequently a temporary cure because the removed graffiti creates, in effect, a new canvas for the tagger, and invitation for another round of graffiti.

Catching the tagger is difficult because the graffiti-making act usually occurs late at night, at no-light or low-light locations, and/or at remote locations. Thus, there is often no witnesses of a graffiti-making act, allowing the tagger to get away without consequence. Even if witnesses exist, they may be too intimidated to report the tagger for fear of retaliation. If a witnesses exists, by the time the witness reports the tagger, the tagger may be long gone when the police arrive. As a result, most graffiti-related crimes go unsolved and unpunished.

SUMMARY OF THE INVENTION

Thus, an aspect of the present invention involves the recognition that a need exists for a graffiti detection system and method that is capable of detecting and reporting a graffiti-making act as it occurs. Such a system and method may give the police or property owner the head start they need to catch a tagger in the act, or if the police do not arrive in time to catch a tagger in the act, give the police the probable cause they need to detain and question any suspicious characters in the vicinity of the reported crime.

An additional aspect of the invention involves a method of detecting a graffiti-making act. The method includes sonically detecting the graffiti-making act, and initiating an alarm indicating that the graffiti-making act took place.

Implementations of the aspect of the invention described immediately above may include one or more of the following. Sonically detecting the graffiti-making act includes sonically detecting the spraying noise of a spray can. Sonically detecting the graffiti-making act includes sonically detecting the sound made by writing with a felt-marker pen on a surface. Sonically detecting the graffiti-making act includes sonically detecting a the sound made by scratching an abrasive instrument on a surface. The abrasive instrument is a member from the group consisting of a stone, a gem, a screwdriver, and a glass cutter. Sonically detecting the graffiti-making act includes sonically detecting the graffiti-making act with a sensor selected from the group consisting of a piezoelectric sensor, a dynamic sensor, an electret sensor, a carbon sensor, a bolometer sensor, an optical reflection sensor, a capacitive sensor, an inductive sound sensor, and an ultrasonic sensor. Sonically detecting the graffiti-making act includes sensing the sound spectrum pattern of the graffiti-making act. Sonically detecting the graffiti-making act further includes sonically focusing sound produced from the graffiti-making act. Sonically focusing sound produced from the graffiti-making act includes sonically focusing the sound with a member selected from the group consisting of phase arrays, reflectors, and lenses. Sonically focusing sound produced from the graffiti-making act includes de-selecting other similar sounds that may effect a false alarm. De-selecting includes baffling sound. Sonically detecting includes filtering sound spectral characteristics of sound from the graffiti-making act. Sonically detecting includes filtering using a technique from the group consisting of duration and time coding of the sound, digital code quantitization, digitized algorithm analysis, and Fourier Transform analysis. The alarm is a member from the group consisting of a bell, a light, a horn, a speaker, a marking means, a camera to record the activity, a camera to monitor the activity, a photo process, a phone device, a wireless communication device, a cage, a trap, and a disabling means. The method further includes confirming that a graffiti-making act took place with one or more additional sensors. The one or more sensors are a member from the group consisting of a motion detector and a heat detector.

Another aspect of the invention involves a method of detecting a graffiti-making act of spraying with a spray paint can. The method includes sonically detecting a spraying noise made from the spray paint can using one or more sonic sensors, and communicating that a graffiti-making act has been detected to one or more entities.

Another aspect of the invention involves a method of detecting a graffiti-making act of spraying with a spray paint can. The method includes detecting a graffiti-making act using one or more sensors, and communicating that a graffiti-making act has been detected to one or more entities.

Implementations of the aspect of the invention described immediately above may include one or more of the following. Detecting a graffiti-making act includes sensing an odor spectrum pattern of the graffiti-making act with an olfactory sensor, and using electronic spectral analysis to determine that a graffiti-making act occurred. Detecting a graffiti-making act includes sonically sensing a sound spectrum pattern of the graffiti-making act with a sonic sensor, and using electronic spectral analysis to determine that a graffiti-making act occurred. The graffiti-making act includes spraying with a spray paint can, and sonically sensing includes sonically sensing a spraying noise of the spray paint can. The graffiti-making act includes spraying with a spray paint can, and sonically sensing includes sonically sensing a rattling noised caused by shaking the spray paint can to mix paint inside the spray paint can. The graffiti-making act includes writing with a felt-marker pen on a surface, and sonically sensing includes sonically sensing a sound made by writing with a felt-marker pen on a surface. The graffiti-making act includes scratching with an abrasive instrument on a surface, and sonically sensing includes sonically sensing the sound made by scratching with an abrasive instrument on a surface. The method further includes confirming that a graffiti-making act took place with at least one motion detector to detect movement of a perpetrator of the graffiti-making act. The method further includes confirming that a graffiti-making act took place with at least one heat detector to detect body heat of a perpetrator of the graffiti-making act. The method further includes confirming that a graffiti-making act took place with at least one sonic detector to detect a sound of the graffiti-making act. The method further includes confirming that a graffiti-making act took place with at least one olfactory detector to detect an odor of the graffiti-making act. Detecting a graffiti-making act includes amplifying a signal from the at least one sensor to a distinguishable level, combining the signal with a predetermined signature signal, reducing signal noise, and determining whether the resulting signal includes a spectrum pattern matching a predetermined spectrum pattern of one or more graffiti-making acts. Communicating to one or more entities includes communicating to a police dispatcher. Communicating to one or more entities includes communicating to one or more police officers on patrol in a general area of the graffiti-making act. Communicating to one or more entities includes communicating to an owner of a property where the graffiti-making act took place. Communicating to one or more entities includes communicating to a security system center. Communicating to one or more entities includes dialing one or more predetermined phone numbers. Communicating to one or more entities includes communicating one or more of the following: a graffiti-marking act has been detected, the location of the graffiti-marking act, the type of graffiti-marking act, the time the graffiti marking act took place. Detecting a graffiti-making act includes detecting a graffiti-making act using one or more sensors and a base unit powered by a battery, and the method further including communicating to one or more entities that the battery is low and needs to be replaced. The one or more sensors communicate wirelessly with a base unit, and detecting a graffiti-making act includes transmitting a signal representative of the graffiti-making act to the base unit for processing of the signal. Detecting the graffiti-making act includes detecting one or more different graffiti-making acts with one or more different types of sensors. Detecting the graffiti-making act includes detecting multiple graffiti-making acts with a single sensor.

An additional aspect of the invention includes a graffiti detection system for detecting a graffiti-making act. The system includes one or more sensors adapted to sense the graffiti-making act and transmit a signal representative of the graffiti-making act, and a base unit including electronics adapted to process the signal and determined whether the signal represents a graffiti-making act, and a communication device coupled to the electronics and adapted to communicate to one or more entities that a graffiti-making act has been detected.

Implementations of the aspect of the invention described immediately above may include one or more of the following. The one or more sensors include one or more olfactory sensors adapted to sense an odor spectrum pattern of the graffiti-making act and transmit a signal representative of the odor spectrum pattern of the graffiti-making act, and the electronics adapted to process the signal to determine if the odor spectrum pattern represents a graffiti-making act. The one or more sensors include one or more sonic sensors adapted to sense a sound spectrum pattern of the graffiti-making act and transmit a signal representative of the sound spectrum pattern of the graffiti-making act, and the electronics adapted to process the signal to determine if the sound spectrum pattern represents a graffiti-making act. The one or more sonic sensors are adapted to sense a spraying noise of a spray can. The one or more sonic sensors are adapted to sense a rattling noised caused by shaking the spray paint can to mix paint inside the spray paint can. The one or more sonic sensors are adapted to sense the sound made by writing with a felt-marker pen on a surface. The one or more sonic sensors are adapted to sense a sound made by scratching with an abrasive instrument on a surface. The system further includes a motion detecting sensor adapted to detect movement of a perpetrator of the graffiti-making act for confirming that a graffiti-making act took place. The system further includes a heat detecting sensor adapted to detect body heat of a perpetrator of the graffiti-making act for confirming that a graffiti-making act took place. The system further includes an olfactory detector adapted to detect an odor of the graffiti-making act for confirming that a graffiti-making act took place. The system further includes a sonic detector adapted to detect a sound of the graffiti-making act for confirming that a graffiti-making act took place. The electronics include a pre-amplifier adapted to amplify the signal from the at least one sensor to a distinguishable level, a mixer adapted to combine the signal with a predetermined signature signal, a low-pass filter and a precision rectifier adapted to reduce signal noise, and a time domain characterization mechanism adapted to determine whether the resulting signal represents a graffiti-making act. The time domain characterization mechanism includes a charge pump. The time domain characterization mechanism includes a quantitative characterization device such as a microprocessor to determine whether the resulting signal includes a spectrum pattern matching a predetermined spectrum pattern of one or more graffiti-making acts for a predetermined period of time. The communication device is adapted to communicate with a police dispatcher. The communication device is adapted to communicate with one or more police officers on patrol in a general area of the graffiti-making act. The communication device is adapted to communicate with an owner of the property where the graffiti-making act took place. The communication device is adapted to communicate with a security system center. The communication device is adapted to dial one or more predetermined phone numbers. The base unit is adapted to be powered by a battery, and the communication device is adapted to communicate to one or more entities that the battery is low and needs to be replaced. The one or more sensors are adapted to communicate wirelessly with the base unit. The one or more sensors are adapted to communicate with the base unit through wired means. The one or more sensors are integral with the base unit. The one or more sensors include one or more different types of sensors adapted to sense one or more different types of graffiti-making acts. The one or more sensors include a single sensor adapted to sense more than one different types of graffiti-making acts. The one or more sensors include one or more of the following types of sensors: a piezoelectric sensor, a dynamic sensor, an electret sensor, a carbon sensor, a bolometer sensor, an optical reflection sensor, a capacitive sensor, an inductive sound sensor, and an ultrasonic sensor. The one or more sensors are adapted to sense the sound of a graffiti-making act up to a distance of 400 feet. The one or more sensors are adapted to send either a 900 megahertz or a spread spectrum signal. The electronics are adapted to filter sound using a technique from the group consisting of duration and time coding of the sound, digital code quantitization, digitized algorithm analysis, and Fourier Transform analysis. The base unit includes an alarm selected from the group consisting of a bell, a light, a horn, a whistle, a speaker, a marking means, a camera to record the activity, a camera to monitor the activity, sprinkler, a cage, a trap, and a disabling means.

A still further aspect of the invention involves a graffiti detection system for detecting a graffiti-making act. The system includes means for sensing the graffiti-making act and transmitting a signal representative of the graffiti-making act, and a base unit including means for determining whether the signal represents a graffiti-making act, and means for communicating to one or more entities that a graffiti-making act has been detected.

Other and further objects, features, aspects, and advantages of the present invention will become better understood with the following detailed description of the accompanying drawings.

BRIEF DESCRIPTION OF THE DRAWINGS

The drawings illustrate both the design and utility of preferred embodiments of the present invention, in which.

DETAILED DESCRIPTION OF THE INVENTION

Figure 1:
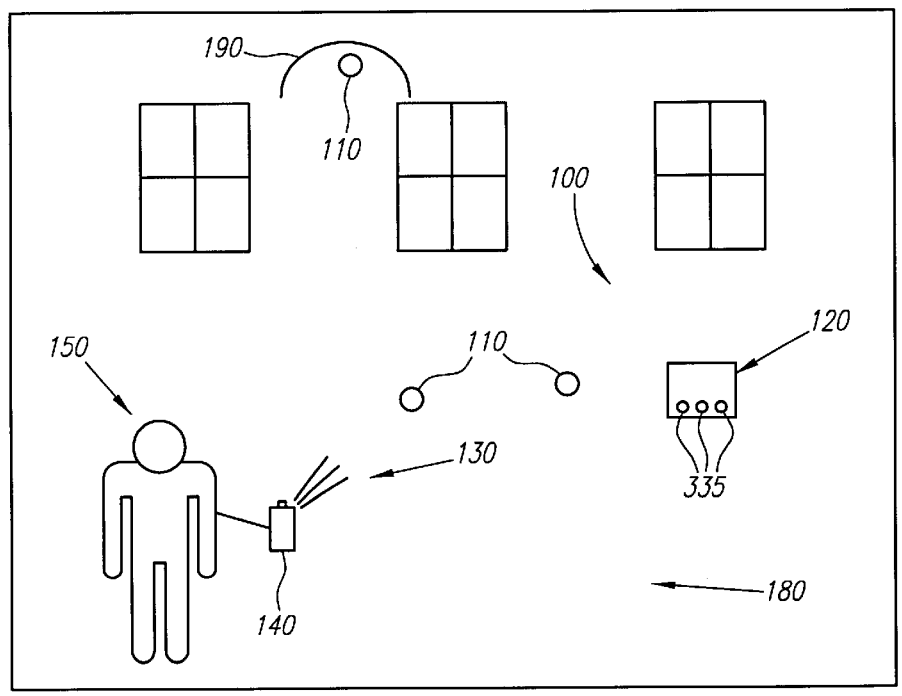
FIG. 1 is an illustration of an embodiment of a graffiti detection system and method in an exemplary environment.

With reference to FIG. 1, an embodiment of a graffiti detection system 100 and method of using the same will now be described. The graffiti detection system 100 detects a graffiti-making act and initiates one or more alarms to indicate that a graffiti-making act occurred. Examples of graffiti-making acts that are capable of being detected by the system 100 include, but not by way of limitation, the spraying noise that occurs with the spraying or tagging of a surface with a spray paint can, the rattling noise that occurs when shaking a spray paint can to mix the paint inside, the sound of a felt marker on a surface as the surface is being marked, and the sound of an abrasive device such as a glass cutter, diamond, razor, etc. as it scratches, defaces, or etches a surface such as glass. The graffiti detection system 100 includes one or more primary sensors 110 and a control unit or base unit 120.

Each primary sensor 110 is preferably a sonic sensor capable of picking up sound waves and converting the sound waves into electronic signals for further processing. Each sonic sensor may be capable of sensing a wide variety of sound frequencies, even sounds in the ultrasound frequency range. Examples of sensors 110 that may be used as a sonic sensor include, but not by way of limitation, a piezoelectric sensor, a dynamic sensor, an electret sensor, a carbon sensor, a bolometer sensor, an optical reflection sensor, a capacitive sensor, an inductive sound sensor, and an ultrasonic sensor used to detect and respond to specific sound spectrum patterns.

A graffiti-making act 130 such as the spraying noise from an aerosol spray paint can 140 by a perpetrator or tagger 150 has a specific sound spectrum frequency pattern or sound signature. The one or more sensors 110 may convert the sound of the spraying noise into a corresponding electronic signal.

Depending on the type of sonic sensor, each sensor 110 may be adapted to pick up a narrow frequency range or individual frequency of sound waves or a broad frequency spectrum of sound waves.

In the first instance, detection of a graffiti-making act 130 may occur, in essence, at the sensor 110. The system 100 may rely more on the inherent frequency characteristics of sensor(s) 110 for identification of a sound signature of a graffiti making act 130. For example, the sensor(s) 110 may only transmit a single frequency signal, e.g., a 900 megahertz signal, if a certain frequency or certain frequencies of sound are picked up by the sensor(s) 110. Thus, a specific sensor 110 may be used to detect a specific graffiti-making act 130, without the requirement of much identification processing by the base unit 120. In this embodiment, if the specific sensor 110 transmits an electronic signal, the base unit 120 may be able to assume, except for some minor processing and possible confirmation, that the specific graffiti-making act 110, which the specific sensor 110 is adapted to sense, has occurred. In this embodiment, different sensors 110 may be assigned to sense different graffiti-making acts 130, one or more of which may be used in the system 100. For example, a sensor A may be used to detect the spraying noise that occurs with the spraying or tagging of a surface with a spray paint can, a sensor B may be used to detect the sound of the rattling noise that occurs when shaking a spray paint can to mix the paint inside, a sensor C may be used to detect the sound of a felt marker on a surface as the surface is being marked, and a sensor D may be used to detect the sound of an abrasive device such as a glass cutter, diamond, razor, etc. as it scratches, defaces, or etches a surface such as glass.

In the latter instance, detection of a graffiti-making act 130 may occur, in essence, at the base unit 120. The system 100 may rely more on the base unit 120 to identify a graffiti-making act 130. In this embodiment, the sensor(s) 110 may pick up a broader range of frequencies and transmit them to the base unit 120 as a spread. spectrum signal for processing and identification. Thus, in order to reduce the number of sensors used to detect a number of different types of graffiti-making acts, a single sensor 110 may be used to sense all the sound frequencies or sound frequency ranges of the graffiti-making acts 130 of interest and use the base unit 120 to process and determine whether the transmitted signal(s) correspond to a graffiti-making act.

The sensor(s) 110 may be one or more of the same or different types of sensors 110. For example, the sensor(s) 110 may include multiple sonic sensors of one or more different sonic sensor types. For example, as described above, specific sensors may be adapted to pick up specific sound frequencies or ranges of sound frequencies. The different types of sensors 110 may be used to pick up different frequency ranges for the same type of graffiti-making act, e.g., different frequency ranges for different spray noises made from different types of spray paint cans, or to pick up different frequency ranges for different types of graffiti-making acts, e.g., a first sensor may be used to detect spray painting, a second sensor may be used to detect the sound of a felt marker on a surface as the surface is being marked, etc.

Further, not only may the one or more sensors 110 be one or more different types of sonic sensors, the one or more sensors 110 may include one or more sensors other than sonic sensors in addition to or instead of one or more sonic sensors. For example, the one or more sensors 110 may include one or more olfactory sensors in addition to or instead of the one or more sonic sensors. An exemplary olfactory sensor that may be used in the system 100 is the NOSE CHIP™ made by Cyrano Sciences, Inc. of Pasadena, Calif. An olfactory sensor may be used in conjunction with the base unit 120 to sense the presence of one or more odors indicative of a graffiti-making act. For example, the olfactory sensor may be used to sense the odor of the propellant from a spray paint can, one or more other chemicals such as those from the paint of a spray paint can, the odor of xylene from a felt-tip marker, etc. One or more olfactory sensors may be used as one or more primary sensors 110 or primary means for detecting the occurrence of a graffiti-making act 130 or as a secondary sensor 335 or secondary means for confirming the occurrence of a graffiti-making act 130.

The one or more sensors 110 may communicate wirelessly with the base unit 120 or may be wired to the base unit 120. In a wireless embodiment, the one or more sensors 110 include a transmitter for wirelessly transmitting the signal(s) to the base unit 120 and a battery or other power supply. If one or more wireless piezoelectric sensors are used, the sensor(s) 110 may be located up to a distance of 400 ft. from the base unit 120 and still communicate therewith. If a 2.4 GHz sensor is used, the sensor(s) 110 may be located at a distance greater than 400 ft. from the base unit 120. A wireless piezoelectric sensor can also sense the noise from a graffiti making at a distance of 1000 ft or more from the graffiti-making act, especially if focusing an baffling mechanisms are used.

It is important to note, although the one or more sensors 110 are shown in FIG. 1 as being separate or remote from the base unit 120, in an alternative embodiment, the one or more sensors 110 may be integrated with the base unit 120 so that the system 100 forms a single unit. Further, one or more of the sensors 110 may be integrated with the base unit 120 and separate therefrom.

The one or more sensors 110 are preferably small, a few inches or less in size, making the sensor(s) 110 easy to conceal. The one or more sensors 100 are preferably strategically located at one or more locations in a vicinity 170 of a surface 180 prone to graffiti. The one or more sensors 110 may be mounted in direct contact with a surface such as, but not by way of limitation, a glass surface, a concrete wall, a brick wall, and the side of a building. Preferably, each sensor 110 is mounted at a location that is inconspicuous and inhibits tampering or deactivation.

The distance between the one or more sonic sensors and the graffiti-making act may be increased, allowing sensing from a more distant, inconspicuous position, if one or more sound focusing mechanisms 190 are used. Examples of sound focusing mechanisms that may effectively increase the signal-to-noise ratio of the sound detected by the one or more sonic sensors include, but not by way of limitation, a parabolic reflector, boom, shotgun directional microphone, phase array, or lens. FIG. 1 illustrates a sound focusing mechanism 190 in the form of a parabolic reflector adjacent to one of the sensors 110 in order to increase the signal-to-noise ratio of the sound detected by the sensor 110.

Figure 2:
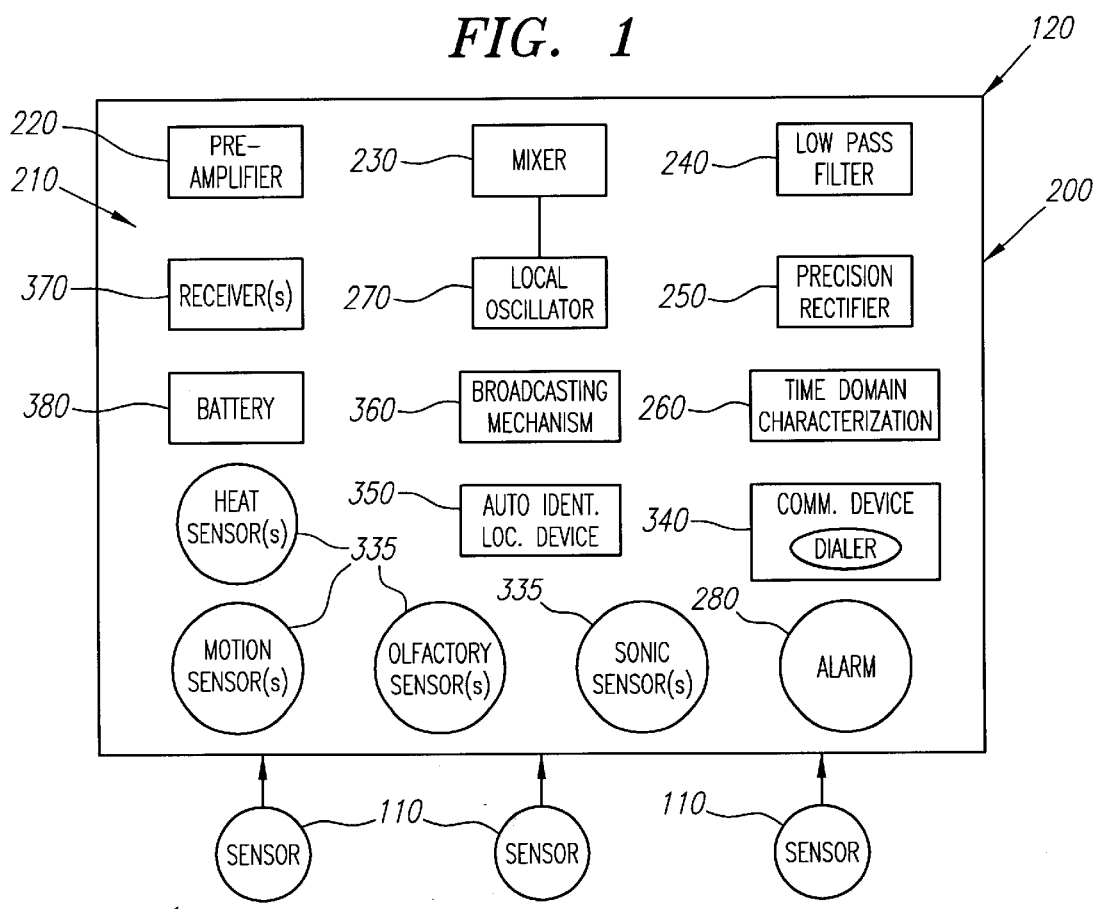
FIG. 2 is a block diagram of an embodiment of the graffiti detection system illustrated in FIG. 1.

With reference additionally to FIGS. 2 and 3, the base unit 120 is also preferably strategically located in the vicinity 170 of the surface 180 prone to graffiti, at a location that is inconspicuous and inhibits tampering or deactivation. The base unit 120 may include a water-resistant housing 200 made of metal or plastic. The base unit 120 may include electronics 210 comprising hardware or hardware and software that processes the signal(s) from the one or more sensors 110, and initiates one or more alarms if a graffiti-making act is identified. The hardware and/or software of the base unit 120 may also determine whether a graffiti-making act 130 occurred by determining whether the signal(s) from the one or more sensors 110 correspond to a graffiti-making act. The hardware and/or software may also perform other functions described herein. Examples of hardware that may perform the functions described herein include, but not by way of limitation, an application specific integrated circuit (ASIC), a set of wired logic circuits, and a hardwired circuit of electrical components, e.g., transistors, capacitors, and resistors. Examples of hardware and software that may perform the functions described herein include, but not by way of limitation, a programmed computer and an application specific computer.

In an embodiment of the base unit 120, the hardware and/or software may include a preamplifier 220, a mixer 230, a low pass filter 240, a precision rectifier 250, and a time domain characterization mechanism 260. The preamplifier 220, the mixer 230, the low pass filter 240, and the precision rectifier 250 may form part of a sensor interface for processing the incoming signal(s) from the one or more sensors 110, which will now be described. A signal from the one or more sensors 110 is amplified by the preamplifier 220 to a distinguishable level. The mixer 230 may combine the resulting signal with a predetermined center frequency from a local oscillator 270. If the frequency of the signal from the one or more sensors 110 closely matches the frequency of the local oscillator signal, heterodyning occurs, producing a high gain product signal. Next, the low pass filter 240 and the precision rectifier 250 combine to improve the signal to noise ratio by eliminating noise such as AC signals and passing only DC signals. The signal may then be authenticated, i.e., a determination may be made as to whether the signal represents a graffiti-making act, by the time domain characterization mechanism 260.

Figure 3A:
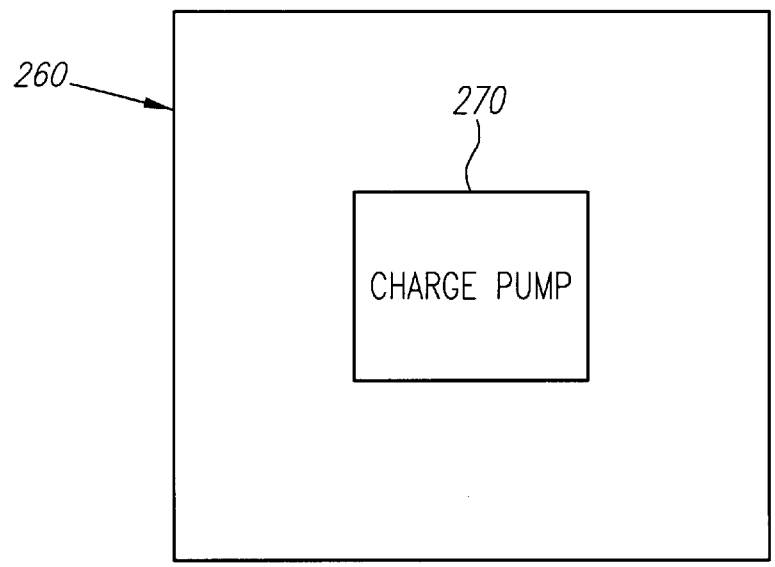
FIG. 3A is block diagram of an embodiment of a time domain characterization mechanism.

With reference to FIG. 3A, in an embodiment of the time domain characterization mechanism 260, the time domain characterization mechanism 260 may include a charge pump 270 for determining whether the signal represents a graffiti-making act 130. The charge pump 270 may include an electric circuit having one or more capacitors. The incoming signal charges the one or more capacitors, causing a rise in voltage over time until a signature signal of sufficient duration is authenticated, i.e., signal is transmitted to the one or more capacitors for a predetermined period of time determined by the time constant selected. Requiring that a signature signal be transmitted for a certain period of time helps to ensure that a graffiti-making act is accurately identified. After the signal is identified, a comparitor is triggered, causing an alarm 280 (FIG. 2) to be actuated. This embodiment of the time domain characterization mechanism 260 may be desirable if the one or more sensors 10 are adapted to pick up a narrow sound frequency range or individual sound frequency similar to or the same as that of a predetermined graffiti-making act because the components of the electronics 210 described above assume that if a signal is transmitted to the electronics 210, the signal is similar to or the same as that of a graffiti-making act, i.e., the one or more sensors 110 only deliver a signal if the frequency of the signal is similar to or the same as that of a graffiti-making act. The charge pump 270 functions to set a minimum time duration condition on the sound sensed by the one or more sensors 110, inhibiting false alarms caused by transient sounds from non-graffiti-making acts of the same or similar frequency. Thus, the charge pump 270 serves to authenticate the signal as one by a graffiti-making act by the ensuring the signal is of a predetermined duration as determined by the type of capacitor used.

Figure 3B:
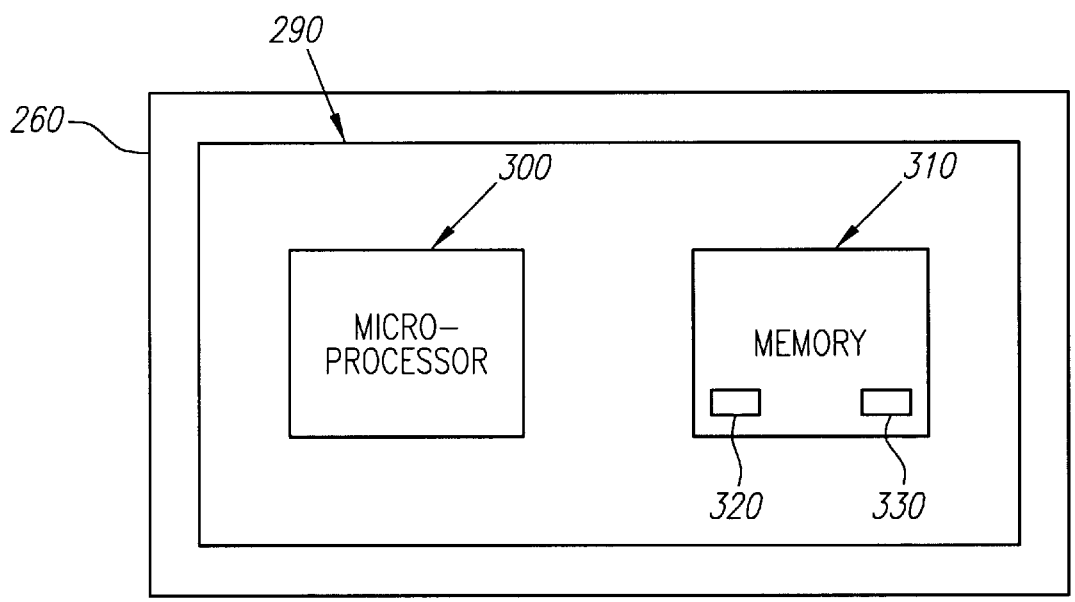
FIG. 3B is a block diagram of an alternative embodiment of a time domain characterization mechanism.

With reference to FIG. 3B, in an alternative embodiment, the time domain characterization mechanism 260 may include a quantization characterization mechanism 290. The quantization characterization mechanism 290 may include a microprocessor 300, which may be the same as or different from any other microprocessor used in the system 100, and memory 310. The microprocessor 300 may use a digital signal processing application 320 stored in memory 310 to convert an analog signal from the low pass filter 240 into a digitized signal, and quantitize the resulting digital signal. The resulting quantitized information may be compared to a matrix of numbers 330 stored in memory 310 or a different memory for authentication of the signal(s) from the one or more sensors 110. The memory 310 may include multiple matrices of numbers 330 representing multiple respective predetermined graffiti-making acts 130 that the quantitized information from one or more signals may be compared to for determining the occurrence of multiple graffiti-making acts 130. The quantitized information may also include the duration of the signal(s) to ensure that the signal(s) is for at least a minimum duration to ensure that a graffiti-making act is accurately identified, inhibiting false alarms. After the signal is identified, the microprocessor 300 may cause the alarm 280 (FIG. 2) to be actuated. This embodiment of the time domain characterization mechanism 260 is desirable if the one or more sensors 110 are adapted to pick up a broad sound frequency range or different broad sound frequency ranges because the quantization characterization mechanism 290 may identify the signals from one or more different types of graffiti-making acts, allowing the graffiti detection system 100 to detect one or more different types of graffiti-making acts.

Those skilled in the art will recognize other well-known sound signature identification techniques may be used such as, but not by way of limitation, digitized algorithm analysis and Fourier Transform analysis.

The electronics 210 of the base unit 120 may include one or more of the following secondary sensors 335 or confirming means to confirm or further ensure that a graffiti-making act 130 occurred: a motion sensor to detect motion of the tagger 150, a heat sensor to sense body heat of the tagger 150, an olfactory sensor to detect an odor of a graffiti-making act, and a sonic sensor to detect a sound of a graffiti-making act.

The alarm 280 initiated or actuated after a graffiti-making act has occurred may include, but not by way of limitation, one or more of the following: an alarm to alert the tagger 150 and/or anyone in the vicinity that a graffiti-making act has been detected such as a bell, a light, a horn, a whistle, or a speaker; a marking mechanism adapted to mark the tagger 150 so that the police can easily identify the tagger 150 and have probable cause to arrest the tagger 150; a water sprinkler to wash the tagged surface 180; an infrared security video camera for recording and/or monitoring the tagger 150 committing the graffiti-making act 130, a flash camera to capture a still image of the tagger 150 committing the graffiti-making act, a disabling mechanism such as a cage, trap, e.g., two doors that automatically lock the tagger 150 in an area therebetween; and one or more communication devices 340 or interfaces. In a preferred embodiment, the alarm 280 does not alert the tagger 150 that a graffiti-making act has been detected by the system 100, but causes the communication device 340 to communicate to one or more entities or locations such as, but not by way of limitation, a police dispatcher so that a nearby police officer can be alerted as to the situation, one or more police officers on patrol in the general area of the graffiti-making act, an owner of the property where the graffiti-making act took place, and/or a sectuity system center that a graffiti-making act has occurred. The communication device 340 may be any well-known communication device such as, but not by way of limitation, a dialer, a modem, a network interface (such as an Ethernet card), a communications port, a PCMCIA slot and card, a short-wave radio, etc. that may communicate voice, text, and/or video information to the one or more entities or locations. For example, the communication device 340 may be a dialer that dials one or more predetermined telephone numbers, pager numbers, wireless cellular or digital telephone numbers, and/or internet phone or device numbers for communicating a prerecorded voice, text message, and/or video clip indicating that the graffiti-making act took place. The voice and/or text message may include one or more of the following: the location of the graffiti-marking act, the type of graffiti-marking act, and/or the time the graffiti marking act took place.

In a preferred embodiment, a dialer is used as the communication device 340 and is capable of both listening at the site where detection has occurred as well as receiving audio and voice messages. The ability to listen as well as emit voice messages at the site where detection has occurred may be used to confirm that a graffiti-making act took place and is not, for example, an owner or city employee lawfully spray painting a surface. The ability to listen may be used to record voice or other sound activity as evidence for a later criminal proceeding, e.g., record voice of the perpetrator that committed the graffiti. The ability to emit an audio and voice message may also be used to confront the perpetrator.

The electronics 210 of the base unit 120 may include an automatic location identification device 350 such as a Global Positioning System ("GPS") device for automatically identifying the location of the base unit 120. Alternatively, the base unit 120 may include a broadcasting mechanism 360 that broadcasts a signal from which the location of the system 100 can be identified and/or that a graffiti-making act 130 has been committed.

If the one or more sensors 110 are wireless, the base unit 120 preferably includes one or more receivers 370 for receiving the respective signal(s) and transmitting the signal(s) to the electronics 210 of the base unit 120.

The base unit 120 is preferably powered by one or more batteries 380, but may be powered by any well-known internal or external power source. If the battery 380 gets low, the electronics 210 may cause the communication device 340 to communicate to one or more entities responsible for replacing the battery 380 that the battery 380 is low and needs to be replaced.

Although the detection system 100 has been described above in conjunction with detection of a graffiti-making act, it will be readily apparent to those skilled in the art that the detection system 100 may be used in other applications to detect other occurrences, besides detecting graffiti.

Figure 4A:
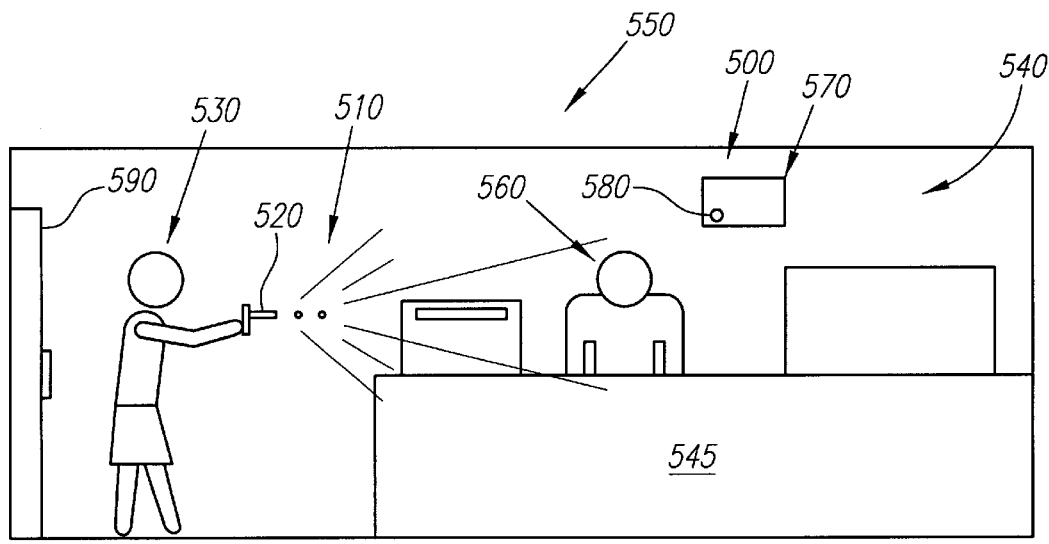
FIG. 4A is an illustration of an embodiment of a detection system similar to that illustrated in FIGS. 1–3, but for use in detection of a firearm shot, and is shown in an exemplary environment.

For example, with reference to FIG. 4A, a detection system 500, which is similar in construction to the detection system 100 described above, may be used to detect the report of a firearm shot 510 from a firearm 520, e.g., a handgun, automatic weapon, rifle, etc., of a perpetrator 530, and an initiate an alarm in response thereto. In the past, when a crime was committed, the police would often show up at the scene of the crime without knowing whether the perpetrator(s) 530 were still in the area of crime scene, and, if so, whether the perpetrator(s) 530 were carrying a lethal weapon such as a firearm 520 that had been discharged. If the police knew one or more shots of a firearm had occurred at a crime scene, the police would know that investigating the crime may be dangerous. The police could prepare accordingly and alert the appropriate medical agencies. Thus, the inventors of the firearm shot detection system and method recognized that such a system and method could detect whether a firearm shot had occurred and alert the police accordingly.

The firearm shot detection system 500 illustrated in FIG. 4A is for fixed use, i.e., the object that the firearm detection system 500 is mounted to is not designed to move or be mobile, such as in possible armed robbery situations. For example, the firearm shot detection system 500 may be mounted to a wall 540 or counter 545 of an establishment 550, e.g., a convenience store such as 7-Eleven™, a jewelry store, a bank, a fast-food restaurant, a home, or any other establishment susceptible to an robbery, accidents, or violence involving a firearm. FIG. 4A illustrates an employee 560 such as a clerk behind the counter 545 of the establishment 550.

The firearm shot detection system 500 includes a base unit 570 and one or more sensors 580. Instead of the one or more sensors 110 and/or base unit 120 described above with respect to FIGS. 1–3 being configured to determine whether the sound signature of an act such as a graffiti-making act occurred, the one or more sensors 580 and/or base unit 570 determine whether the sound signature of a firearm shot 510 occurred. In FIG. 4A, a single sonic sensor 580 is illustrated as being integrated with the base unit 570. As described above, in an alternative embodiment, the one or more sensors 580 may be separate or remote from the base unit 570.

Because the firearm shot detection system 500 is so similar in construction to the graffiti detection system 100 described above, further details as to the construction or structure of the firearm shot detection system 500 will not be described in additional detail. The discussion above with respect to the construction of the graffiti detection system 100 is equally applicable to the firearm shot detection system 500, and is thereby incorporated by reference.

An embodiment of a method of using the firearm shot detection system 500 will now be described. During a hold-up, burglary, robbery, etc., the perpetrator 530 of the crime (or the employee 560 of the establishment 550 in defense) may fire a firearm 120 such as a handgun, automatic weapon, rifle, etc. The report of the firearm shot 510 includes sound waves having a characteristic sound signature frequency or frequency pattern. A firearm shot 510 from each type of firearm, e.g., handgun, automatic weapon, rifle, etc., and each brand of firearm, e.g., Smith & Wesson™, Colt™, etc. has a unique sound signature frequency or frequency pattern similar to each different graffiti-making acts having a unique sound signature frequency or frequency pattern, as described above. The one or more sensors 580 convert the sound from the firearm shot 510 into an electronic signal or electronic signals that are processed by the electronics 210 in the base unit 570 for determining whether the electronic signal(s) are from a firearm shot 510 using any of the techniques described above or any other well-known technique used in sound signature analysis. If it is determined that the electronic signal(s) represents a firearm shot, one or more alarms are initiated. The one or more alarms may include one or more of the alarms described above with respect to the graffiti detection system 100 and method. One type of alarm that may be initiated upon detection of a firearm shot 510 is the locking of one or more automatic locking mechanisms for one or more doors 590. This may be desirable, for example, to lock the perpetrator 530 in an area between a pair of door 590 assuming that no innocent bystanders are in this detaining area with the perpetrator. Preferably, the one or more alarms include actuating a communication to an entity or location such as a police dispatcher, one or more police officers in the area, and/or a security system center alerting the entity that a firearm shot 510 was detected at the location of the establishment. Communicated information may include, but not by way of limitation, a firearm shot 520 was detected, the location of the firearm shot, the time of the firearm shot, the number of firearm shots detected, and/or the type of firearm shot. Thus, the firearm detection system 500 detects the sound signature of the report of one or more firearm shots, and may automatically alert the police in response thereto.

Figure 4B:
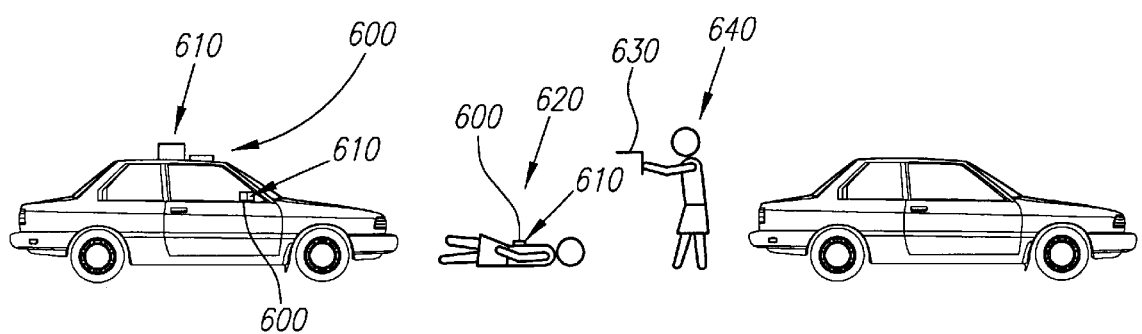
FIG. 4B is an illustration of an alternative embodiment of a firearm shot detection system and method and is shown in an alternative exemplary environment.

With reference to FIG. 4B, in another embodiment of the invention, a firearm shot detection system 600 similar to the firearm shot detection system 500 described above may be mounted to a mobile object 610 or be part of the mobile object 610. Examples of mobile objects include, but not by way of limitation, a police car, a police motorcycle, an armed money truck, an emergency vehicle, a limousine, an expensive car, a navigational system such as a GPS system, a wireless phone, a wireless internet device, a radio communication system, and any other portable communication device. Police officers are often shot at when investigating a crime or in the process of making an aitest. If a police officer is alone and is shot, the police officer may not be found in time for appropriate medical care to arrive. Further, if the police officer becomes engaged in a gun fight with one or more perpetrators, the police officer may not be able to radio a police dispatcher or other police officers for assistance without the risk of getting shot or allowing the one or more perpetrators to escape.

FIG. 4B illustrates a number of exemplary embodiments of and locations for the firearm shot detection system 600. For example, the firearm shot detection system 600 may be mounted on a mobile object 610 such as a police car driven by a police officer 620. The firearm shot detection system 600 may be in the vehicle, as part of a radio communication system of the police car. The firearm shot detection system 600 may also be a wearable device or part of a wearable device such as part of a mobile object 610 that is a two-way radio. Similar to the firearm shot detection system 500 described above, the firearm shot detection system 600 detects the sound signature from the report of a firearm shot from a firearm 630 of a perpetrator 640, and may initiate one or more of the alarms described above. Preferably, the firearm shot detection system 600 will automatically communicate with a police dispatcher that a firearm shot has been detected. If the firearm shot detection system 600 is part of a communication device such as two-way radio or wireless phone, the firearm shot detection system 600 may communication with one or more entities such as a police dispatcher using the existing communication device. Similar to the detection system 100 described above, the firearm shot detection system 600 may include an automatic location identification device such as a GPS device for automatically identifying the location of the firearm shot detection system 600, and, hence, the general location of the firearm shot detected. The firearm shot detection system 600 may automatically report to the police dispatcher one or more of the following: a firearm shot was detected, the location of the firearm shot, the time of the firearm shot, the number of firearm shots detected, and/or the type of firearm shot.

Figure 5:
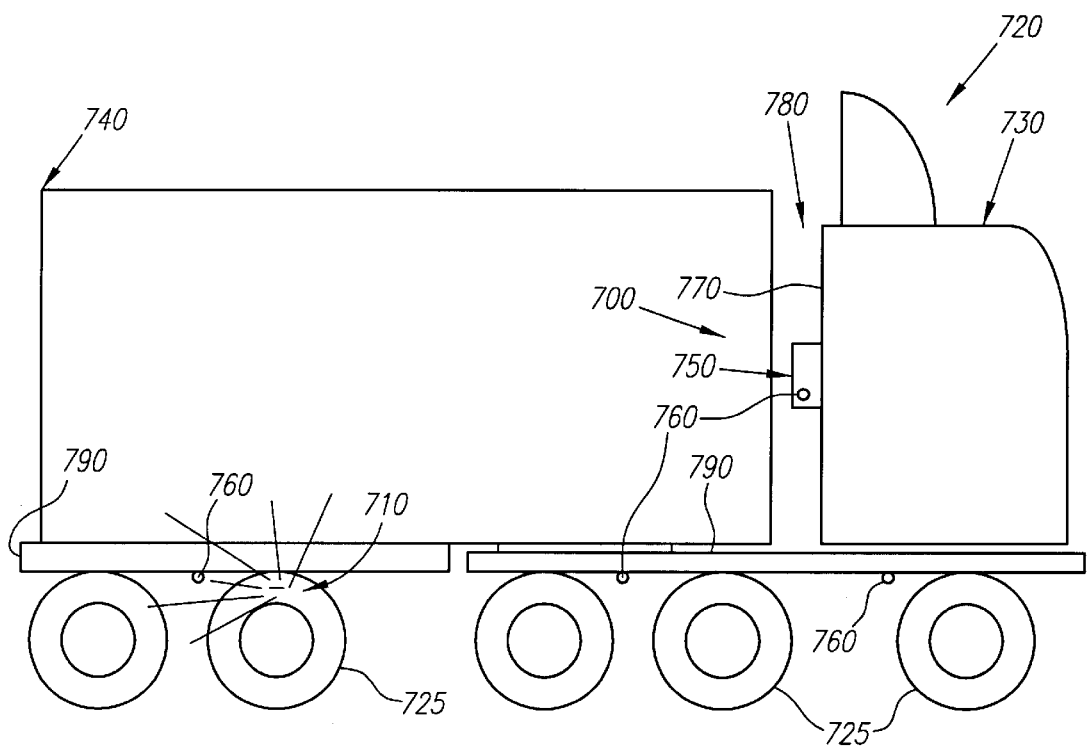
FIG. 5 is an illustration of an embodiment of a detection system similar to that illustrated in FIGS. 1–3, but for use in detection of a vehicle tire leak, and is shown in an exemplary environment.

With reference to FIG. 5, another application of the detection system will now be described. A detection system 700 similar to the detection system 100 described above may be used to detect a tire leak 710 from a tire 725 of a vehicle 720 such as a truck 730 and/or trailer 740 and initiate an alarm in response thereto. A damaged or blown tire 725 can be a dangerous hazard for the driver of a vehicle 720 and/or other drivers on the road in the vicinity of the vehicle. For example, a blown tire from a large truck can cause the truck to swerve erratically and jackknife. Not only is this dangerous for the driver and any passengers of the truck, but it poses a real hazard to surrounding vehicles. The swerving truck may collide with other vehicles on the road or may cause vehicles to swerve, increasing the probability of one or more vehicle accidents. Further, if the blown tire remains on the road, vehicles may swerve to miss the tire or may collide with the tire, increasing the probability of additional vehicle accidents.

A blown or severely damaged tire usually results from a small hole or tear in the tire 725. This small hole or tear usually emits a leaking noise 710 caused by compressed air escaping the small hole or tear in the tire 725. If a vehicle driver and/or dispatcher, e.g., truck dispatcher, knew of a tire leak 710 in one of the tires 725 of the vehicle 720, the driver could have the tire repaired, replaced, or take the necessary precautions. Thus, the inventors of the vehicle tire leak detection system 700 and method recognized that such a system and method could detect whether a tire leak 710 had occurred and alert the vehicle driver and/or dispatcher accordingly.

The tire leak detection system 700 includes a base unit 750 and one or more sensors 760. Instead of the one or more sensors 110 and/or base unit 120 described above with respect to FIGS. 1–3 being configured to detect whether the sound signature of a graffiti-making act occurred, the one or more sensors 760 and/or base unit 750 may detect whether the sound signature of a tire leak 710 occurred.

It should be noted, the one or more sensors 760 and/or base unit 750 may determine whether a tire 725 is going flat by detecting sounds indicative of a tire going flat other than a tire leak 710. For example, as a tire 725 goes flat, a unique noise may be made as the tire 725 contacts the road, e.g., the tire may make a slapping sound of a detectable characteristic frequency or frequencies. This sound or other sounds may be the basis of determining whether a tire 725 is going flat.

The base unit 750 may be mounted to the vehicle 720 in a strategic location such as, but not by way of limitation, a rear side 770 of a cab 780 if the vehicle 720 is a truck or somewhere on a chassis 790 of the vehicle 720. Similarly, the one or more sensors 760 may be mounted to the vehicle 720 in a strategic location such as, but not by way of limitation, on the chassis 790 of the vehicle 720, adjacent the tires 725. As described above, the one or more sensors 760 may be integrated with the base unit 750 or separate therefrom. Because the tire leak detection system 700 is so similar in construction to the graffiti detection system 100 described above, further details as to the construction or structure of the tire leak detection system 700 will not be described in additional detail. The discussion above with respect to the construction of the graffiti detection system 100 is equally applicable to the tire leak detection system 700, and is thereby incorporated by reference.

An embodiment of a method of using the tire leak detection system 700 will now be described. It is common for the tire 725 of a vehicle 720 to become damaged during normal use by sharp objects such a nails, glass, etc. A cut or hole in the tire 725 caused by the sharp object may cause a leak 710. The tire leak 710 is a precursor to further tire damage, and a potential multiple vehicle accident, as described above. The tire leak 710 emits sound waves having a characteristic sound signature frequency or frequency pattern. The tire leak 710 may have a unique sound signature frequency or frequency pattern for different types of leaks, at different tire pressures, for different types of tires, etc.

The one or more sensors 760 convert the sound from the tire leak 710 into an electronic signal or electronic signals that are processed by the electronics 210 in the base unit 750 to determine whether the electronic signal(s) represent one or more different types of tire leaks. If it is determined that the electronic signal(s) represents a tire leak, one or more alarms are initiated. The one or more alarms may include one or more of the alarms described above with respect to the graffiti detection system 100 and method. Preferably, the one or more alarms include a communication to the driver of the vehicle 720 alerting the driver that a tire leak 710 has been detected. If the vehicle 720 is a large truck 730 and/or trailer 740, an additional alarm may include a communication to a truck dispatcher alerting the dispatcher that a tire leak 710 has been detected.

Similar to the detection system 100 described above, the tire leak detection system 700 may include an automatic location identification device such as a GPS device for identifying the location of the tire leak detection system 700, and, hence, the location of the vehicle.

Reported information to the driver and/or dispatcher may include, but not by way of limitation, a tire leak has been detected, the time of the tire leak, the wheel that the leak is from, the location of the vehicle, and/or the type of tire leak. Thus, the tire leak detection system 700 detects the sound of one or more tire leaks 710 of a vehicle 720, and automatically alerts the driver and/or the dispatcher in response thereto.

Figure 6:
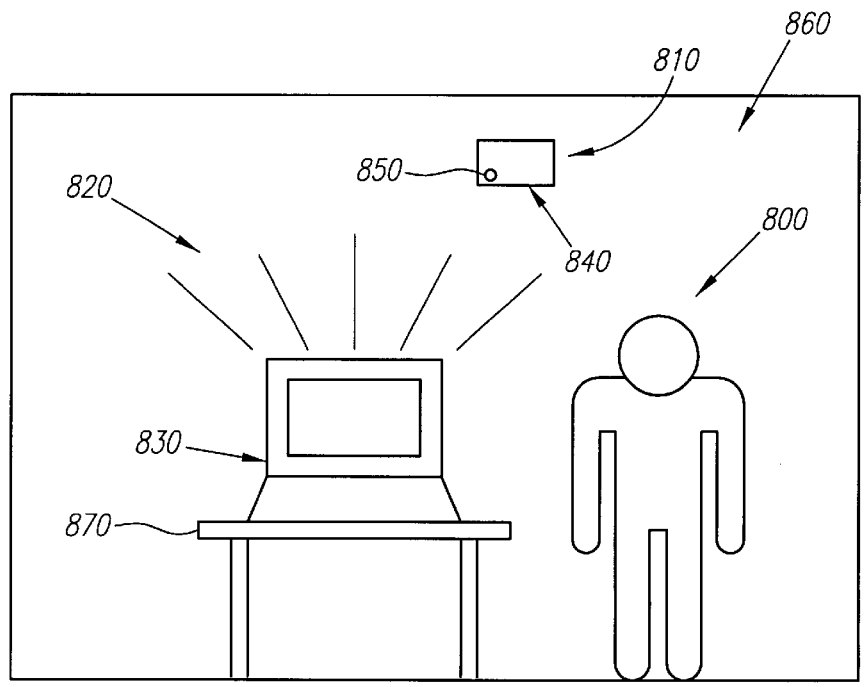
FIG. 6 is an illustration of an embodiment of a detection system similar to that illustrated in FIGS. 1–3, but for use in detecting the use of equipment such as a computer, and is shown in an exemplary environment.

With reference to FIG. 6, another application of the detection system will now be described. Problems can occur as a result of conduct or acts that cause the emission of a sound of a characteristic frequency or frequencies. If the conduct or act could be detected and reported immediately, the frequency of the resulting problem may be eliminated or reduced. An exemplary scenario is the unauthorized use by an unauthorized co-worker or other individual 800 of an authorized individual's equipment. A detection system 810 similar to the detection system 100 described above may be used to detect a sound or other characteristic 820 indicative of the use of equipment 830 such as a computer, cash register, copy machine or any other equipment one wishes to protect or prevent the unauthorized use of and initiate an alarm in response thereto.

During operation or use of equipment 830, especially electronic equipment, one or more sounds or other characteristics 810 occur that indicate the equipment 830 is being used. Examples include, but not by way of limitation, one or more beeps from a computer upon start-up, the ring of a cash register when a the register drawer is opened, the humming of a fan or hard drive in a computer, the transmittance of signals in a computer, the typing on a computer keyboard, the dialing or connecting sound of a facsimile machine, and the noise emitted during the scanning step of a copy machine. If an authorized individual, employer, etc. knew the equipment 830 was being used without authorization, the necessary precautions, remedial action, etc. could be taken. Thus, the inventors of the equipment use detection system 810 and method recognized that such a system and method could detect whether one or more sounds or other characteristics 820 indicative of equipment use had occurred and alert the authorized individual, employer, etc. accordingly.

The equipment use detection system 810 includes a base unit 840 and one or more sensors 850. Instead of the one or more sensors 110 and/or base unit 120 described above with respect to FIGS. 1—3 being configured to detect whether the sound signature of a graffiti-making act occurred, the one or more sensors 850 and/or base unit 840 may detect whether one or more sounds or other characteristics 810 indicative of equipment use occurred.

The base unit 840 and one or more sensors 850 (if the one or more sensors 850 are separate from the base unit 840) are preferably mounted in one or more strategic locations that are inconspicuous and where they are not likely to be tampered with or damaged. In one embodiment, the base unit 840 and one or more sensors 850 are not connected directly to the equipment 830 being monitored, inhibiting the unauthorized individual 800 from spotting the equipment. The base unit 840 could be mounted on a wall 860, under a desk or table 870, or any other strategic location. As described above, the one or more sensors 850 may be integrated with the base unit 840 or separate therefrom. Because the equipment use detection system 810 is so similar in construction to the graffiti detection system 100 described above, further details as to the construction or structure of the equipment use detection system 810 will not be described in additional detail. The discussion above with respect to the construction of the graffiti detection system 100 is equally applicable to the equipment use detection system 810, and is thereby incorporated by reference.

An embodiment of a method of using the equipment use detection system 810 will now be described. The equipment 830 may emit sound waves 820 having a characteristic sound signature frequency or frequency pattern. Different types of equipment use may cause different sounds having a unique sound signature frequency or frequency pattern. Further, the same type of equipment 830 may emit different sounds indicative of equipment use.

The one or more sensors 850 may include one or more sonic sensors that convert the sound from the equipment use into an electronic signal or electronic signals that are processed by the electronics 210 in the base unit 840 to determine whether the electronic signal(s) represent one or more different types of equipment use. If it is determined that the electronic signal(s) represents equipment use, one or more alarms are initiated. The one or more alarms may include one or more of the alarms described above with respect to the graffiti detection system 100 and method. Preferably, the one or more alarms include a communication to the authorized individual, the employer, security, police, etc. indicating that equipment use has been detected. An additional type of alarm that may be initiated if, for example, the equipment 830 is electronic is an automatic shut-down mechanism that shuts down, e.g., cuts power to, the equipment 830.

Similar to the detection system 100 described above, the equipment use detection system 810 may include an automatic location identification device such as a GPS device for identifying the location of the equipment use detection system 810. Such an automatic location identification device may be desirable if the equipment is of a mobile nature such as an automobile.

Reported information to the authorized individual, the employer, security, police, etc. may include, but not by way of limitation, an equipment use has been detected, the time of the equipment use, the type of equipment use, and/or the location of the equipment use. Thus, the equipment use detection system 810 detects the use of one or more different types of equipment use, and automatically alerts the authorized individual, the employer, security, police, etc. in response thereto.

The detection system 810 may be used to detect the use of electronic and nonelectronic equipment 830. Further, the one or more sensors 850 may include one or more types of sensors other than sonic sensors that detect use of the equipment other than through detection of an emitted sound. For example, the one or more sensors could determine that a carbon monoxide detector has been actuated and communicate this to one or more entities in the manner described above.

In another scenario, instead of the detection system 810 detecting and reporting the act of equipment use, the detection system 810 may detect and report other acts such as the conduct of a baby crying. With more and more parents becoming full-time working parents, the need for baby or childcare has increased dramatically in recent years. One of the biggest concerns of parents who have hired full or part-time baby or childcare is that their baby or child be treated properly by the childcare. This has been an increasing concern in recent times with the numerous reports of nannies severely abusing babies. In another embodiment, the detection system 810 may be adapted to detect and report an act of interest such as the crying of a baby. The one or more sensors 850 may pick up the characteristic frequency or frequencies or a baby's cry and the base unit 840 may process the signal(s) to determine if the signal(s) correspond to a baby's cry, and, if so, initiate one or more alarms. One alarm may be communicating to one or both of the parents that the baby is crying. This communication may be made by any well-known manner, e.g., e-mail, page, telephone call, cellphone call, videophone call, etc. The parent(s) could then check on the baby's condition by, for example, contacting the hired childcare, viewing a video image of the baby transmitted by the communication or by other means, etc.

Although the detection system has been described in conjunction with detecting a graffiti-making act, a firearm shot, a vehicle tire leak, and an act or conduct such as equipment use and the crying of a baby, and actuating an alarm in response thereto, it will be readily apparent to those skilled in the art that the detection system described above may be used in other applications such as, but not by way of limitation.

While preferred methods and embodiments have been shown and described, it will be apparent to one of ordinary skill in the art that numerous alterations may be made without departing from the spirit or scope of the invention. Therefore, the invention is not to be limited except in accordance with the following claims.

What is claimed is:

1. A method of detecting a graffiti-making act, comprising:

providing a graffiti-making act detection system to detect a graffiti-making act, the graffiti-making act detection system including one or more sonic sensors to sense sound having a characteristic frequency or frequencies representative of the graffiti-making act and transmit a signal or signals in response to the sound of the graffiti-making act; and a base unit including electronics to process the signal or signals, and an alarm to indicate that a graffiti-making act has been detected;

locating the one or more sonic sensors and the base unit of the graffiti-making act detection system near a structure prone to receiving graffiti;

sonically sensing with said one or more sonic sensors sound having a characteristic frequency or frequencies representative of a graffiti-making act and transmitting a signal or signals in response to the sound of the graffiti-making act to the electronics;

processing the signal or signals in response to the sound of the graffiti-making act with the electronics;

initiating an alarm indicating that the graffiti-making act took place if the signal or signals represent a sound of a graffiti-making act.

2. The method of claim 1, wherein said step of sensing includes sensing a characteristic frequency or frequencies representative of the spraying noise of a spray can.

3. The method of claim 1, wherein said step of sensing includes sensing a characteristic frequency or frequencies representative of the sound made by writing with a felt-marker pen on a surface.

4. The method of claim 1, wherein said step of sensing includes sensing a characteristic frequency or frequencies representative of the sound made by scratching an abrasive instrument on a surface.

5. The method of claim 4, wherein the abrasive instrument is a member from the group consisting of a stone, a gem, a screwdriver, and a glass cutter.

6. The method of claim 1, wherein said one or more sensors include one or more sensors selected from the group consisting of a piezoelectric sensor, a dynamic sensor, an electret sensor, a carbon sensor, a bolometer sensor, an optical reflection sensor, a capacitive sensor, an inductive sound sensor, and an ultrasonic sensor.

7. The method of claim 1, wherein sensing a characteristic frequency or frequencies representative of a graffiti-making act includes sensing the sound spectrum pattern of the graffiti-making act.

8. The method of claim 1, further including sonically focusing sound produced from the graffiti-making act.

9. The method of claim 8, wherein sonically focusing sound produced from the graffiti-making act includes sonically focusing the sound with a member selected from the group consisting of phase arrays, reflectors, and lenses.

10. The method of claim 8, wherein sonically focusing sound produced from the graffiti-making act includes de-selecting other similar sounds that may effect a false alarm.

11. The method of claim 10, wherein de-selecting includes baffling sound.

12. The method of claim 1, wherein processing the signal or signals includes filtering sound spectral characteristics of sound from said graffiti-making act.

13. The method of claim 1, wherein processsing the signal or signals includes filtering using a technique from the group consisting of duration and time coding of the sound, digital code quantitization, digitized algorithm analysis, and Fourier Transform analysis.

14. The method of claim 1, wherein the alarm is a member from the group consisting of a bell, a light, a horn, a speaker, a marking means, a camera to record the activity, a camera to monitor the activity, a photo process, a phone device, a wireless communication device, a cage, a trap, and a disabling means.

15. The method of claim 1, further including confirming that a graffiti-making act took place.

16. The method of claim 15, wherein confirming includes confirming by at least one of detecting motion of a tagger and confirming body heat of a tagger.

17. The method of claim 1, wherein initiating an alarm includes communicating that a graffiti-making act has been detected to one or more entities.

18. The method of claim 17, wherein the one or more entities are a member selected from the group consisting of police, a security representative, and a owner of a property where the graffiti-making act took place.

19. The method of claim 1, wherein the one or more sensors are one or more ultrasonic sensor, and sensing includes sensing an ultrasonic sound having a characteristic frequency or frequencies representative of a graffiti-making act.

20. The method of claim 1, wherein the one or more sensors are integrated with the base unit.

21. The method of claim 1, further including determining at at least one of the one or more sensors and the electronics whether a sound is representative of a graffiti-making act.

22. A method of detecting a graffiti-making act of spraying with a spray paint can, comprising:

providing a graffiti-making act detection system to detect the sound of spraying with a spray paint can, the graffiti-making act detection system including one or more sonic sensors to sense sound having a characteristic frequency or frequencies representative of the spraying with a spray paint can and transmit a signal or signals in response to the sound of spraying with a spray paint can; and a base unit including electronics to process the signal or signals, and an alarm to indicate that the sound of spraying with a spray paint can has been detected;

locating the one or more sensors and the base unit of the graffiti-making act detection system near a structure prone to graffiti caused by spraying with a spray paint can;

sonically sensing with said one or more sonic sensors sound having a characteristic frequency or frequencies representative of spraying with a spray paint can and transmitting a signal or signals in response to the sound of spraying with a spray paint can to the electronics;

processing the signal or signals in response to the sound of spraying with a spray paint can with the electronics;

communicating that a graffiti-making act has been detected to one or more entities if the signal or signals represent the sound of spraying with a spray paint can.

23. The method of claim 22, wherein the one or more sensors are one or more ultrasonic sensors, and sensing includes sensing an ultrasonic sound having a characteristic frequency or frequencies representative of a graffiti-making act.

24. The method of claim 22, wherein the one or more sensors are integrated with the base unit.

25. The method of claim 22, further including determining at at least one of the one or more sensors and the electronics whether a sound is representative of a graffiti-making act.

26. A method of detecting a graffiti-making act, comprising:
   providing a graffiti-making act detection system to detect a graffiti-making act, the graffiti-making act detection system including one or more sensors to sense a characteristic frequency or frequencies representative of the graffiti-making act and transmit a signal or signals in response to the graffiti-making act; and a base unit including electronics to process the signal or signals; and a communication device to communicate to one or more entities that a graffiti-making act has been;
   locating the one or more sensors and the base unit of the graffiti-making act detection system near a structure prone to receiving graffiti;
   sensing with said one or more sensors a characteristic frequency or frequencies representative of a graffiti-making act and transmitting a signal or signals in response to the graffiti-making act to the electronics;
   processing the sigal or signals in response to the graffiti-making act with the electronics;
   communicating to one or more entities using said communication device that a graffiti-making act has been detected if the signal or signals are determined to represent a graffiti-making act.

27. The method of claim 26, wherein said one or more sensors include one or more odor sensors and sensing includes sensing an odor spectrum pattern of the graffiti-making act with an olfactory sensor, and using electronic spectral analysis to process and determine whether a graffiti-making act occurred.

28. The method of claim 26, wherein said one or more sensors include one or more sonic sensors, and said step of sensing includes sonically sensing sound having a characteristic frequency or frequencies representative of the graffiti-making act.

29. The method of claim 28, wherein the graffiti-making act includes spraying with a spray paint can, and said step of sonically sensing includes sonically sensing a characteristic frequency or frequencies representative of the sound of a spraying noise of the spray paint can.

30. The method of claim 28, wherein the graffiti-making act includes spraying with a spray paint can, and said step of sonically sensing includes sonically sensing a characteristic frequency or frequencies representative of the sound of a rattling noised caused by shaking the spray paint can to mix paint inside the spray paint can.

31. The method of claim 28, wherein the graffiti-making act includes writing with a felt-marker pen on a surface, and said step of sonically sensing includes sonically sensing a characteristic frequency or frequencies representative of a sound made by writing with a felt-marker pen on a surface.

32. The method of claim 28, wherein the graffiti-making act includes scratching with an abrasive instrument on a surface, and said step of sonicaily sensing includes sonically sensing a characteristic frequency or frequencies representative of the sound made by scratching with an abrasive instrument on a surface.

33. The method of claim 28, wherein the one or more sensors are one or more ultrasonic sensors, and sensing includes sensing an ultrasonic sound having a characteristic frequency or frequencies representative of a graffiti-making act.

34. The method of claim 28, wherein the one or more sensors are integrated with the base unit.

35. The method of claim 28, further including determining at at least one of the one or more sensors and the electronics whether a sound is representative of a graffiti-making act.

36. The method of claim 26, further including confirming that a graffiti-making act took place by detecting motion indicative of a perpetrator.

37. The method of claim 26, further including confirming that a graffiti-making act took place by detecting body heat of a perpetrator.

38. The method of claim 26, further including confirming that a graffiti-making act took place by listening for sounds indicative of a perpetrator.

39. The method of claim 26, further including confirming that a graffiti-making act took place by sensing an odor indicative of a graffiti-making act taking place.

40. The method of claim 26, wherein said step of processing includes amplifying said signal or signals to a distinguishable level, combining the signal with a predetermined signature signal, reducing signal noise, and determining whether the resulting signal includes a spectrum pattern matching a predetermined spectrum pattern of one or more graffiti-making acts for a predetermined period of time.

41. The method of claim 26, wherein communicating to one or more entities includes communicating to police.

42. The method of claim 26, wherein communicating to one or more entities includes communicating to a member from the group consisting of a police dispatcher and one or more police officers on patrol in a general area of the graffiti-making act.

43. The method of claim 26, wherein communicating to one or more entities includes communicating to an owner of a property where the graffiti-making act took place.

44. The method of claim 26, wherein communicating to one or more entities includes communicating to a security system center.

45. The method of claim 26, wherein communicating to one or more entities includes dialing one or more predetermined phone numbers.

46. The method of claim 26, wherein communicating to one or more entities includes communicating one or more of the following: a graffiti-marking act has been detected, the location of the graffiti-marking act, the type of graffiti-marking act, the time the graffiti marking act took place.

47. The method of claim 26, wherein detecting a graffiti-making act includes detecting a graffiti-making act using one or more sensors and a base unit powered by a power source, the method further including communicating to one or more entities that the power source needs to be replaced.

48. The method of claim 26, wherein said one or more sensors communicate wirelessly with a base unit, and sensing a graffiti-making act includes wirelessly transmitting a signal or signals in response to the graffiti-making act to the base unit for processing of the signal or signals.

49. The method of claim 26, wherein sensing the graffiti-making act includes sensing one or more different graffiti-making acts with one or more different types of sensors.

50. The method of claim 26, wherein sensing the graffiti-making act includes sensing multiple graffiti-making acts with a single sensor.

51. A graffiti detection system for detecting a graffiti-making act, comprising:
   one or more sonic sensors adapted to sonically sense sound of the graffiti-making act and transmit a signal or signals in response to the sound of the graffiti-making act; and
   a base unit including
      electronics adapted to process the signal or signals in response to the sound of the gaffiti-making act; and
      a communication device coupled to the electronics to communicate to one or more entities that a graffiti-making act has been detected, wherein at least one of the one or more sensors and the electronics are adapted to determine whether a sound is representative of a graffiti-making act and the one or more sensors and the electronics to be located near a structure prone to receiving graffiti.

52. The system of claim 51, wherein said one or more sonic sensors are adapted to sense a spraying noise of a spray can.

53. The system of claim 51, wherein said one or more sonic sensors are adapted to sense a rattling noised caused by shaking a spray paint can to mix paint inside the spray paint can.

54. The system of claim 51, wherein said one or more sonic sensors are adapted to sense the sound made by writing with a felt-marker pen on a surface.

55. The system of claim 51, wherein said one or more sonic sensors are adapted to sense a sound made by scratching with an abrasive instrument on a surface.

56. The system of claim 51, further including a motion detecting sensor adapted to detect movement of a perpetrator of the graffiti-making act for confirming that a graffiti-making act took place.

57. The system of claim 51, further including a heat detecting sensor adapted to detect body heat of a perpetrator of the graffiti-making act for confirming that a graffiti-making act took place.

58. The system of claim 51, further including an olfactory detector adapted to detect an odor of the graffiti-making act for confirming that a graffiti-making act took place.

59. The system of claim 51, further including means for listening for sounds indicative of a perpetrator for confirming that a graffiti-making act took place.

60. The system of claim 51, wherein said electronics include a pre-amplifier adapted to amplify the signal or signals to a distinguishable level, a mixer adapted to combine the signal or signals with a predetermined signature signal, a low-pass filter and a precision rectifier adapted to reduce signal noise, and a time domain characterization mechanism adapted to determine whether the resulting signal represents a graffiti-making act for a predetermined period of time.

61. The system of claim 60, wherein said time domain characterization mechanism includes a charge pump.

62. The system of claim 60, wherein said time domain characterization mechanism includes a quantitative characterization device such as a microprocessor to determine whether the resulting signal includes a spectrum pattern matching a predetermined spectrum pattern of one or more graffiti-making acts for a predetermined period of time.

63. The system of claim 51, wherein said communication device is adapted to communicate with police.

64. The system of claim 51, wherein said communication device is adapted to communicate with a member from the group consisting of a police dispatcher and one or more police officers on patrol in a general area of the graffiti-making act.

65. The system of claim 51, wherein said communication device is adapted to communicate with an owner of the property where the graffiti-making act took place.

66. The system of claim 51, wherein said communication device is adapted to communicate with a security system center.

67. The system of claim 51, wherein said communication device is adapted to dial one or more predetermined phone numbers.

68. The system of claim 51, wherein said base unit is adapted to be powered by a power source, and said communication device is adapted to communicate to one or more entities that the power source needs to be replaced.

69. The system of claim 51, wherein said one or more sensors are adapted to communicate wirelessly with said base unit.

70. The system of claim 51, wherein said one or more sensors are adapted to communicate with said base unit through wired means.

71. The system of claim 51, wherein said one or more sensors are integral with said base unit.

72. The system of claim 51, wherein said one or more sensors include one or more different types of sensors adapted to sense one or more different types of graffiti-making acts.

73. The system of claim 51, wherein said one or more sensors are ultrasonic sonic sensors adapted to sense ultrasonic sound.

74. The system of claim 51, wherein said one or more sensors are one or more sonic sensors adapted to sense sound frequencies or a sound frequency that is the same as or similar to that of the sound of one or more specific graffiti-making acts.

75. The system of claim 51, wherein said one or more sensors include a single sensor adapted to sense more than one different types of graffiti-making acts.

76. The system of claim 51, wherein said one or more sensors include one or more of the following types of sensors: a piezoelectric sensor, a dynamic sensor, an electret sensor, a carbon sensor, a bolometer sensor, an optical reflection sensor, a capacitive sensor, an inductive sound sensor, and an ultrasonic sensor.

77. The system of claim 51, wherein said one or more sonic sensors are adapted to sense the sound of a graffiti-making act up to a distance of 400 feet.

78. The system of claim 51, wherein said one or more sonic sensors are adapted to send either a 900 megahertz or a spread spectrum signal.

79. The system of claim 51, wherein said electronics are adapted to filter sound using a technique from the group consisting of duration and time coding of the sound, digital code quantitization, digitized algorithm analysis, and Fourier Transform analysis.

80. The system of claim 51, wherein said base unit includes an alarm selected from the group consisting of a bell, a light, a horn, a whistle, a speaker, a marking means, a camera to record the activity, a camera to monitor the activity, sprinkler, a cage, a trap, and a disabling means.

81. A graffiti detection system for detecting a graffiti-making act, comprising:
    means for sonically sensing a sound representative of a graffiti-making act and transmitting a signal in response to the sound of the graffiti-making act; and
    a base unit including
        means for processing the signal or signals in response to the sound of a graffiti-making act; and
        means for communicating to one or more entities that a graffiti-making act has been detected,
    wherein at least one of the sonically sensing means and the processing means are adapted to determine whether a sound is representative of a graffiti-making act and the one or more sensors and the electronics to be located near a structure prone to receiving graffiti.

* * * * *